United States Patent
Pike et al.

(10) Patent No.: US 7,938,433 B2
(45) Date of Patent: May 10, 2011

(54) STROLLER SOFT GOODS ATTACHMENT

(75) Inventors: Robert T. Pike, Annandale, NJ (US);
Sharon L. Griffiths, Reading, PA (US)

(73) Assignee: Graco Children's Products Inc., Exton, PA (US)

(*) Notice: Subject to any disclaimer, the term of this patent is extended or adjusted under 35 U.S.C. 154(b) by 1084 days.

(21) Appl. No.: 11/688,825

(22) Filed: Mar. 20, 2007

(65) Prior Publication Data
US 2007/0222167 A1  Sep. 27, 2007

Related U.S. Application Data (60) Provisional application No. 60/784,103, filed on Mar. 20, 2006.

(51) Int. Cl.
*B62B 7/00* (2006.01)

(52) U.S. Cl. ..... 280/647; 280/650; 280/47.4; 280/47.38

(58) Field of Classification Search .......... 280/647–650, 280/658, 47.38, 47.39, 47.4, 642, 644, 47.18, 280/47.41, 304.1; 297/184.1, 184.15, 184.17, 297/97.21
See application file for complete search history.

(56) References Cited

U.S. PATENT DOCUMENTS

| | | | | |
|---|---|---|---|---|
| 1,347,517 A | * | 7/1920 | Meinecke et al. | 296/97.21 |
| 1,443,937 A | * | 1/1923 | Buxton | 206/38.1 |
| 1,568,063 A | * | 1/1926 | Fagen | 5/99.1 |
| 1,758,110 A | * | 5/1930 | Eugene | 296/107.02 |
| 1,758,895 A | * | 5/1930 | Shaw | 296/63 |
| 1,764,914 A | * | 6/1930 | Vande | 280/643 |
| 1,869,205 A | * | 7/1932 | Mahr | 280/647 |
| 1,999,927 A | * | 4/1935 | Milton | 2/247 |
| 2,634,162 A | * | 4/1953 | Beynon | 296/110 |
| 3,079,194 A | * | 2/1963 | Thomas | 296/97.21 |
| 3,089,541 A | | 5/1963 | Lockshin | |
| 3,116,069 A | * | 12/1963 | Dostal | 280/30 |
| 3,162,460 A | * | 12/1964 | Davidson | 280/647 |
| 184,867 A | | 11/1976 | Hazelip | |
| 4,635,926 A | | 1/1987 | Minkow | |
| 5,146,656 A | | 9/1992 | Huang | |
| 5,205,185 A | | 4/1993 | Herman | |
| 5,224,396 A | | 7/1993 | Lobbezoo et al. | |

(Continued)

FOREIGN PATENT DOCUMENTS

EP   1 403 166   3/2004

OTHER PUBLICATIONS

User guide for Quinny Buzz™ stroller, 2007.

(Continued)

*Primary Examiner* — J. Allen Shriver, II
*Assistant Examiner* — Bridget Avery
(74) *Attorney, Agent, or Firm* — Lempia Summerfield Katz LLC

(57) ABSTRACT

Disclosed herein are soft goods attachment designs and techniques for a stroller. The stroller includes a frame having a section, and further includes a soft goods component with an edge having a loop that forms a tunnel running along the edge. The soft goods component is attached to the section of the frame at the edge. A support strip is inserted in the tunnel and shaped to extend along the edge of the soft goods component and follow the section of the frame to facilitate attachment of the soft goods component to the frame. In some cases, a set of fasteners extends through the support strip to secure the soft goods component to the frame.

22 Claims, 5 Drawing Sheets

U.S. PATENT DOCUMENTS

| | | |
|---|---|---|
| 5,562,300 A | 10/1996 | Nelson |
| 5,921,139 A | 7/1999 | Yamane |
| 6,068,284 A | 5/2000 | Kakuda |
| D474,426 S | 5/2003 | Hartenstein et al. |
| 6,921,102 B2 | 7/2005 | Hsia |
| 7,377,527 B2 | 5/2008 | Cunningham |
| 7,410,186 B2 | 8/2008 | Hartenstein et al. |
| 2003/0132614 A1 | 7/2003 | Kreamer |
| 2003/0201626 A1 | 10/2003 | Hartenstein et al. |
| 2004/0183275 A1 | 9/2004 | Chen |
| 2004/0194361 A1 | 10/2004 | Furlan et al. |
| 2006/0145446 A1 | 7/2006 | Schmider |

OTHER PUBLICATIONS

Product information for Convaid Metro transport chairs from www.convaid.com, 2003.

User guide for Quinny Zapp™ Stroller, 2007.

International Search Report and Written Opinion issued in corresponding International Application No. PCT/US2007/064449 mailed Mar. 10, 2010.

* cited by examiner

STROLLER SOFT GOODS ATTACHMENT

CROSS-REFERENCE TO RELATED APPLICATION

This application claims the benefit of U.S. provisional application entitled "Stroller," filed Mar. 20, 2006, and having Ser. No. 60/784,103, the entire disclosure of which is hereby expressly incorporated by reference.

BACKGROUND OF THE DISCLOSURE

1. Field of the Disclosure

The disclosure relates generally to strollers and, more particularly, to the attachment of stroller soft goods.

2. Brief Description of Related Technology

Strollers, particularly collapsible strollers, are well known in the art to include a variety of soft goods. Attachment of the soft goods to the structural components of the stroller is typically done by wrapping the soft goods around a frame. For example, an occupant seat often has a seat bottom and seat back wrapped around a structural frame. Other examples of stroller soft goods supported by a frame include a storage basket disposed beneath the seat and a canopy extending over the occupant. In many cases, such soft goods are wrapped around a frame dedicated to the particular stroller component, rather than the principal structural frame for the stroller.

The limitations and drawbacks of this approach to soft goods attachment arise from the wrap around the frame tubing. Covering the frame tubing can limit the available ornamental design alternatives and characteristics of the frame. Functionality involving the frame may also be limited. For example, the wrapped frame tubing may not be as easily engaged by other components of the stroller (e.g., an accessory tray) via a pressure fit or other coupling.

Another style of attachment involves a channel in the frame tubing to which the edges of the soft goods are retained. This design unfortunately requires a custom extrusion, which can be expensive.

SUMMARY OF THE DISCLOSURE

In accordance with one aspect of the disclosure, a stroller includes a frame having a section, and further includes a soft goods component with an edge including a loop. The soft goods component is attached to the section of the frame at the edge of the soft goods component. The stroller still further includes a support strip disposed in the loop and shaped to extend along the edge of the soft goods component and follow the section of the frame to facilitate attachment of the soft goods component to the frame.

In some cases, the stroller further includes a set of fasteners that attach the soft goods component to the frame. The set of fasteners may extend through the support strip to facilitate the attachment of the soft goods component to the frame. In these and other cases, the edge of the soft goods component may also include a wrap extending from the loop to cover the set of fasteners. Alternatively or additionally, the support strip includes a molded component having a plurality of recessed areas to accept the set of fasteners.

In some embodiments, the section of the frame includes a tubular structure having an oval-shaped cross-section. The tubular structure may include a flattened surface to which the edge of the soft goods component is attached. Alternatively or additionally, the support strip is shaped to engage the flattened surface of the tubular structure.

In one embodiment, the support strip includes welting. Alternatively or additionally, the support strip includes a plastically deformable material shaped to follow a contour of the section of the frame. In other embodiments, the support strip includes a semi-rigid material shaped to follow a contour of the section of the frame, Alternatively or additionally, the support strip includes a molded component having integral fasteners.

In some cases, the loop forms a tunnel along the edge of the soft goods component through which the support strip runs.

In accordance with another aspect of the disclosure, a method of assembling a stroller includes the steps of (i) inserting a support strip through a tunnel formed by a loop of a soft goods component disposed at an edge of the soft goods component, (ii) positioning the soft goods component along a contour of a frame such that the support strip extends along the edge of the soft goods component and follows the contour of the frame, and (iii) fastening the soft goods component to the frame with a set of fasteners distributed along the contour of the frame.

In some cases, the method further includes the step of bending the support strip into a shape to accommodate the contour of the frame.

In some embodiments, the loop is secured in place by stitching.

In accordance with yet another aspect of the disclosure, a stroller includes a frame and a soft goods component with an edge having a loop that forms a tunnel running along the edge. The soft goods component is attached to a section of the frame at the edge. A support strip inserted in the tunnel is shaped to extend along the edge of the soft goods component and follow the section of the frame to facilitate attachment of the soft goods component to the frame. A set of fasteners extends through the support strip to secure the soft goods component to the frame.

In some cases, the edge of the soft goods component wraps around the support strip to extend from the loop and cover the set of fasteners.

The section of the frame may include a tubular structure having an oval-shaped cross-section. The tubular structure may include a flattened surface to which the edge of the soft goods component is attached. The support strip may then be shaped to engage the flattened surface of the tubular structure.

In one embodiment, the support strip includes a molded component having a plurality of recessed areas to accept the set of fasteners.

BRIEF DESCRIPTION OF THE DRAWING FIGURES

For a more complete understanding of the disclosure, reference should be made to the following detailed description and accompanying drawing figures, in which like reference numerals identify like elements in the figures, and in which.

While the disclosed soft goods attachment configurations and methods are susceptible of embodiments in various forms, there are illustrated in the drawing (and will hereafter be described) specific embodiments of the invention, with the understanding that the disclosure is intended to be illustrative, and is not intended to limit the invention to the specific embodiments described and illustrated herein.

DETAILED DESCRIPTION OF PREFERRED EMBODIMENTS

The invention generally relates to strollers and the attachment of soft goods to stroller frames in a manner that provides greater design flexibility involving the frames. In one aspect, the greater design flexibility arises from avoiding having soft goods wrapped around the frame. Consequently, the frames remain accessible and visible after the attachment of the soft goods. Such accessibility permits additional items to be attached via a C-clip or other pressure fit arrangement. Moreover, the absence of soft goods wrapping around the frame helps to keep the soft goods within the frame interior, which may prevent or minimize interference with objects or items outside of the frame during folding, expanding and other stroller operations.

Figure 1:
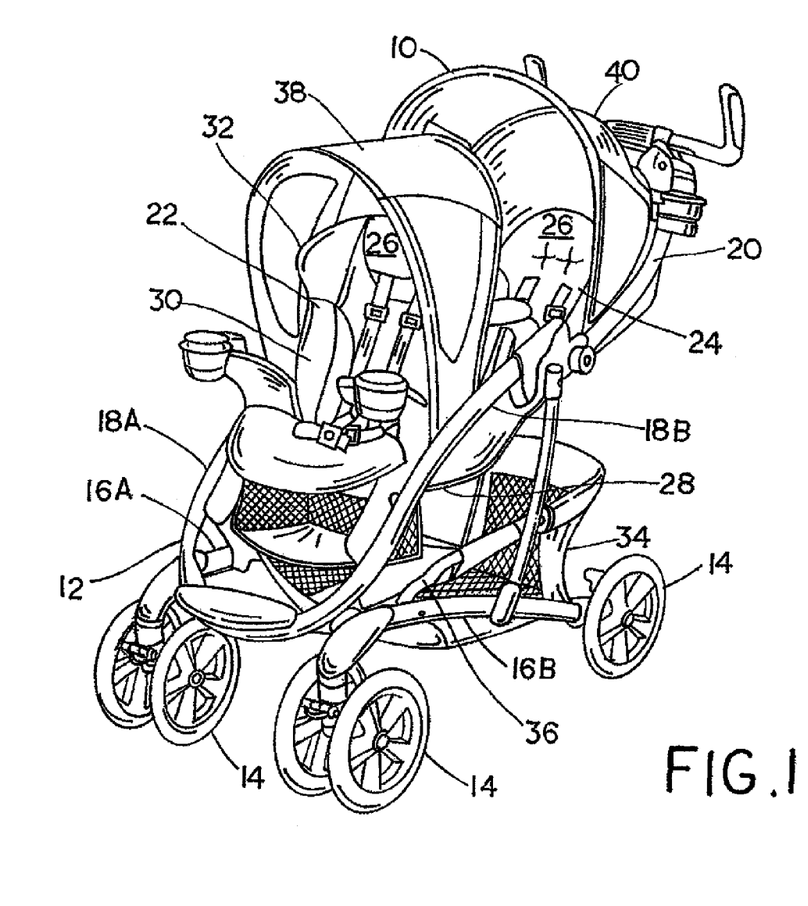
FIG. 1 is a front perspective view of an exemplary stroller having soft goods components, any number of which may be attached to a stroller frame in accordance with aspects of the disclosure.

Turning now to the drawings, FIG. 1 is a perspective view of one example of a stroller 10 constructed in accordance with the teachings of the present disclosure. The stroller 10 includes a number of well known components that are not described in detail herein. Generally speaking, the stroller 10 has a principal frame (or frame assembly) 12 supported on a ground surface by one or more wheels 14. In this example, the frame 12 has a pair of spaced apart lower sections 16A and 16B and a pair of spaced apart upper sections 18A and 18B, which are coupled to one another by cross-member, link, or other interconnecting structures. The frame sections 18A and 18B may form a unitary, U-shaped frame element, as shown. The frame 12 also includes a rear section 20 extending from one or both of the upper sections 18A and 18B. As with the upper sections 18A and 18B, the rear section 20 may be U-shaped and connected to both of the upper sections 18A and 18B at each of its ends. Alternatively, the frame 12 may include an additional rear section (not shown) extending from one of the pair of upper sections 18A and 18B on the other side (not shown) of the stroller 10.

The stroller 10 in the example of FIG. 1 has a forward seat 22 and a rear seat 24 in a stadium seating configuration. However, the disclosed designs and techniques are well suited for use with many different types of strollers and a variety of different seat configurations. Suitable strollers include those having frame structures that are collapsible so that the stroller can be reconfigured between a set-up condition for use, as depicted in FIG. 1, and a collapsed condition (not shown). Suitable strollers further include those having only a single seat, suitable for one occupant, as well as those having more than one seat to accommodate multiple occupants, whether in a stadium seating arrangement (as shown), a side-by-side seating configuration, a dual front and rear facing seating arrangement, or other arrangements.

Figure 2:
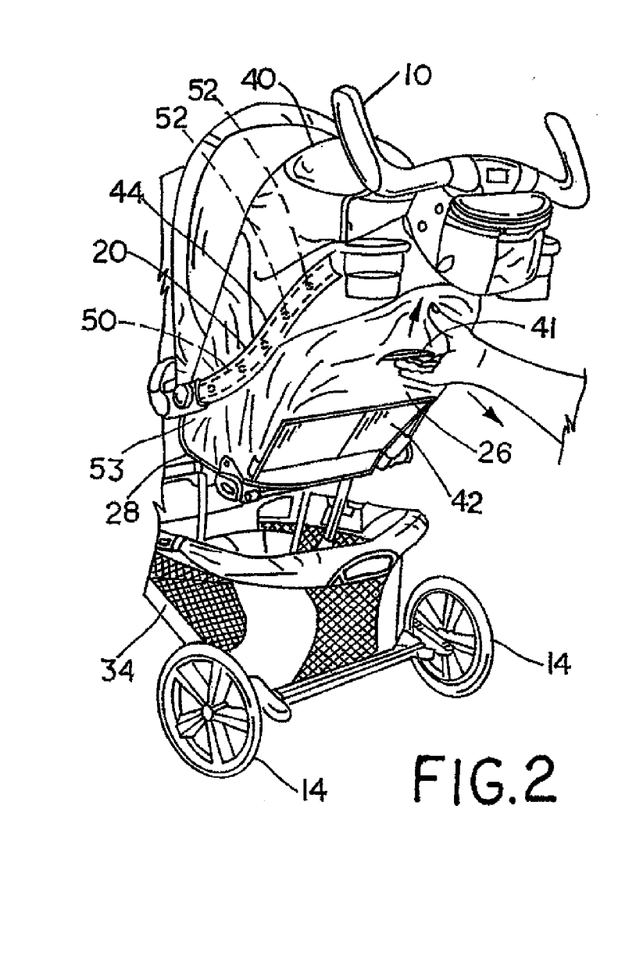
FIGS. 2 and 3 are partial rear, perspective views of the stroller of FIG. 1 showing a seat attached to a frame section in accordance with one embodiment and disposed in upright and reclined positions, respectively; and, FIG. 4 is a partial, detailed view of the attachment of the frame section and seat of FIGS. 2 and 3 in accordance with one embodiment.
Figure 3:
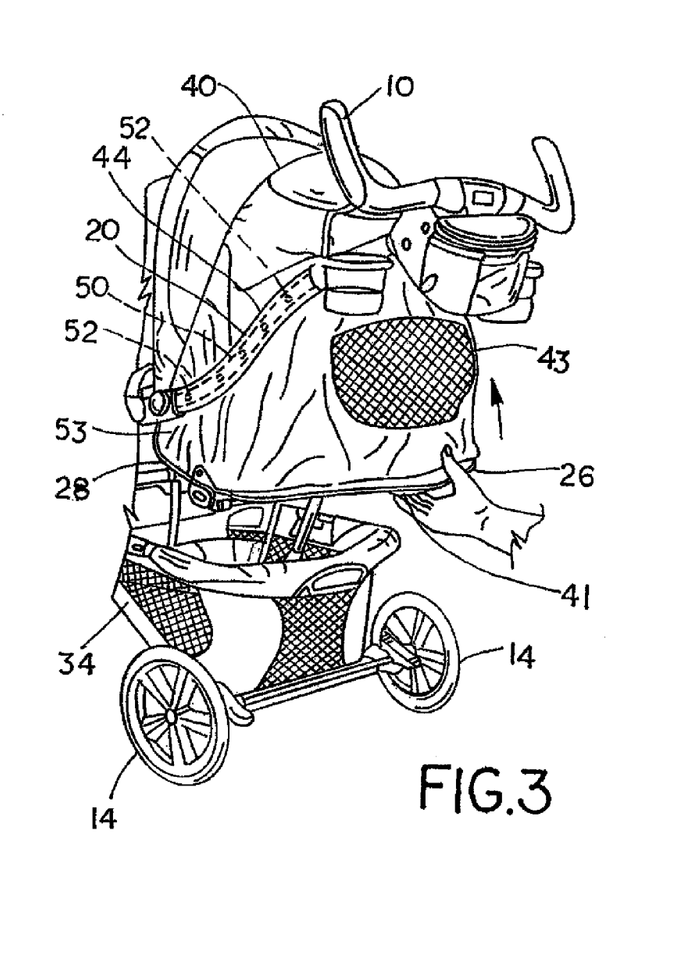

Each seat 22, 24 has a generally forward facing seat back 26 and a generally upward facing seat bottom 28, though the seat back and bottom may be inclined (or inclinable) relative to respective vertical and horizontal reference planes, as desired, and best shown for the rear seat 24 in FIGS. 2 and 3. The seat 22 also includes side bolsters 30 and a head bolster 32 extending from the seat back 26. These soft goods components of the seat 22 are positioned between the frame side sections 18A and 18B, while the components of the seat 24 are positioned within the interior of the rear section(s) 20. Taken together, these soft goods components of the seats 22, 24 may be suspended or supported by the frame assembly 12 (and/or any unit or portion thereof) in accordance with the attachment techniques and designs described below.

The stroller 10 also includes a basket 34 supported by a basket frame 36, and forward and rear canopies 38 and 40 supported by respective frames (not shown). The soft goods components of the basket 34 and canopies 38, 40 may also be attached to frame sections in accordance with aspects of the disclosure, although not depicted as such in the drawing figures. In other words, the basket 34 and canopies 38, 40 need not have soft goods attached to respective frames via the conventional wraparound technique (as shown). More generally, the soft goods attachment designs and techniques described below may be applied to, and utilized in connection with, any soft goods component of the stroller 10, as desired.

FIGS. 2 and 3 present a rear view of the stroller 10 and, more specifically, the soft goods components of the rear seat 24. FIG. 2 depicts the rear seat 24 in a generally upright (or reclined) position, while FIG. 3 shows the transition to a flat position via operation of a lever 41. In the upright position, the seat occupant is seated, while the flat position may be configured to accept an infant car seat or otherwise accommodate an occupant lying across both the seat bottom 28 and the seat back 26. The seat back 26 may include a reinforcing support 42 made of a material more firm than the other fabric of the seat 24. The soft good components of the seat 24 may also include any number of additional items, components, and features of varying composition. For example, transition to the flat position reveals an enclosure having a mesh window 43 (FIG. 3).

In either one of the upright or flat positions, the soft goods components of the seat 24 remain attached to the frame section 20. In this exemplary case, the frame section 20 includes tubing 44, although the disclosed attachment designs and techniques are not limited to any type or shape of frame.

Figure 4:
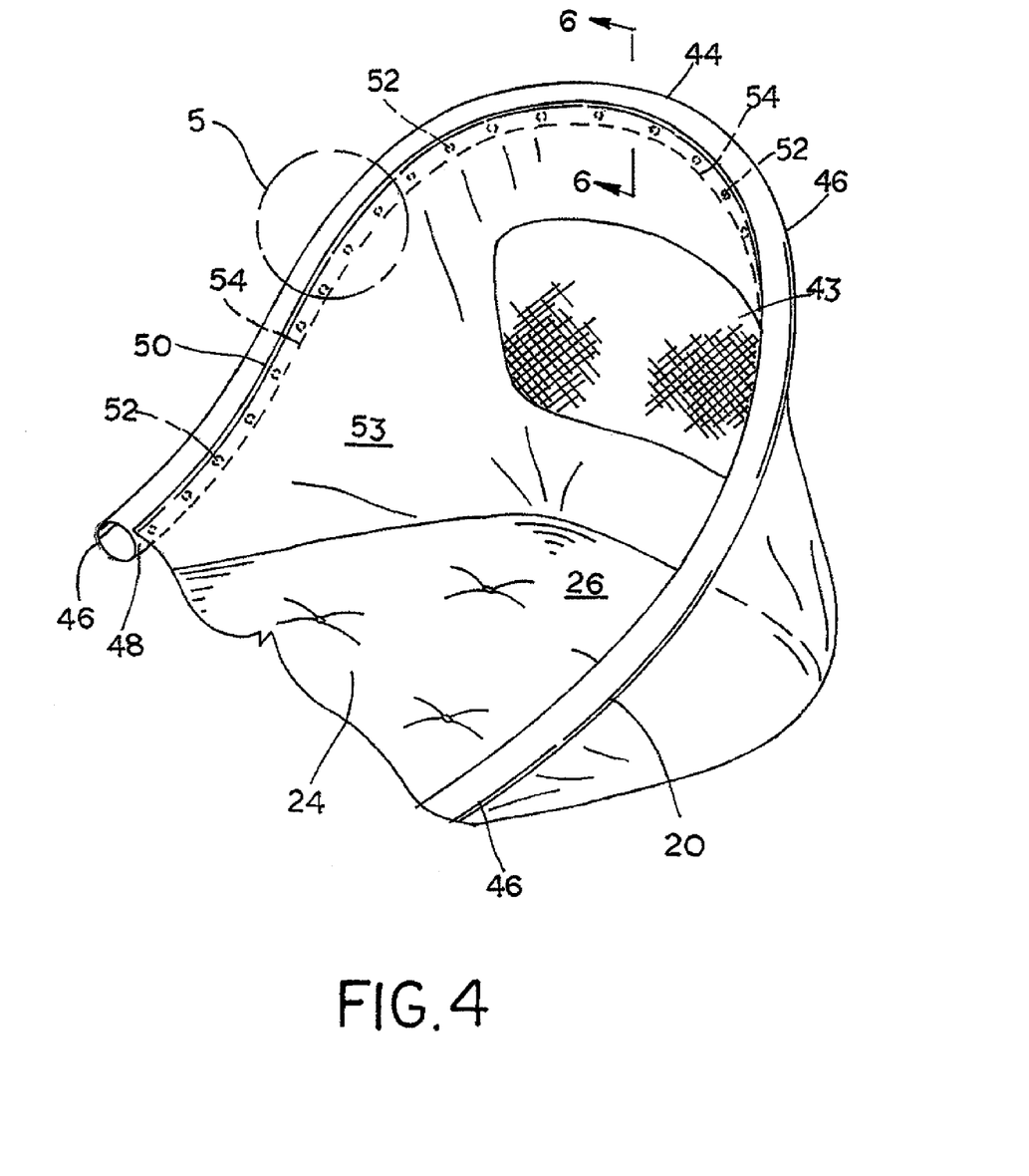
Figure 5:
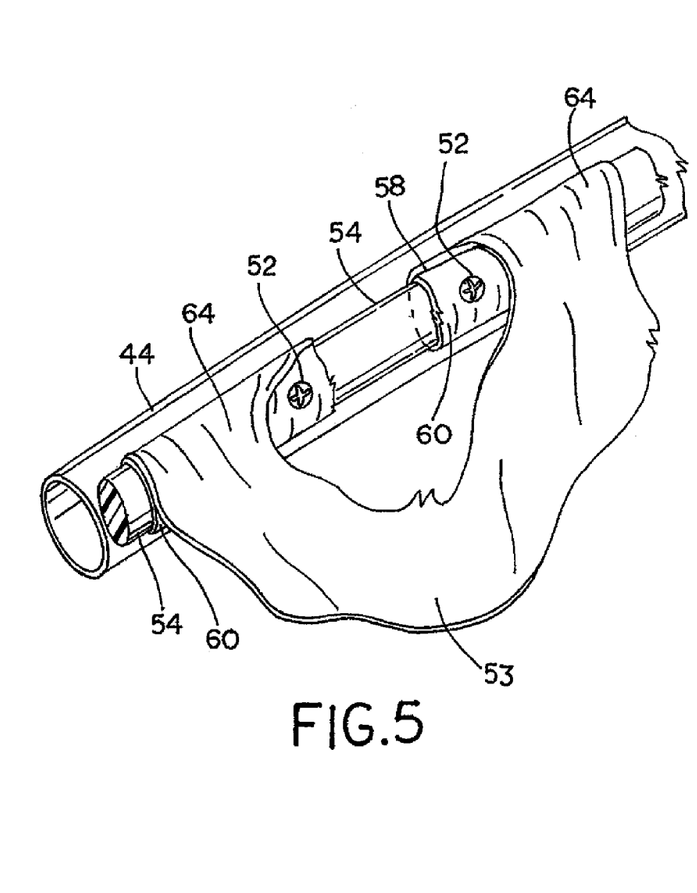
FIG. 5 is a cutaway view of a portion of the frame section and edge of the seat of FIG. 4, taken along line 5 of FIG. 4, and showing an attachment configuration in accordance with one embodiment.

As best seen in FIG. 4, the tubing 44 has an outwardly facing surface 46 and an inwardly facing surface 48. An edge 50 of the soft goods component is attached to the inwardly facing surface 48 in accordance with one aspect of the disclosure. In this exemplary case, the attachment is achieved via a set of fasteners 52 that couple the edge 50 of the soft goods component to the inwardly facing surface 48 of the tubing 44. The fasteners 52 may extend through the edge 50, which may correspond with welting formed from fabric 53 or other soft goods materials extending away from the surface 48. In alternative embodiments or non-seating contexts, one or more other suitable fastening mechanisms may be utilized or included (e.g., hook and loop, adhesives, etc.). The fasteners 52 need not involve a transverse attachment element, such as a screw, but rather may involve an in-plane (or planar) attachment mechanism, as described below in connection with the exemplary embodiments shown in FIGS. 7A-7C.

The tubing 44 and, more generally, the frame section 20 may be shaped to present any contour along which the soft goods component is attached. In the exemplary case presented by the frame section 20, the edge 50 of the seat 24 is attached along a U-shaped contour formed by the inwardly facing surface 48. Practice of the disclosed techniques and designs is not limited to any contour shape, length, etc.

In accordance with one aspect of the disclosure, soft goods components such as those associated with the seat 24 are attached to the frame section(s) via a support strip 54 best shown in FIGS. 5 and 6A-6C. As shown in FIG. 4 as well, the support strip 54 is shaped to extend along the edge 50 of the soft goods component and follow the contour of the frame section 20. In this way, the support strip 54 is disposed along the inwardly facing surface 48 of the tubing 44.

The support strip 54 may be shaped in some cases to facilitate engagement with the tubing 44. For example, the support strip 54 may have a flattened cross-section as shown in FIGS. 5 and 6A-6C. More generally, the support strip 54 may constitute or include a molded component to accommodate the contour of the tubing 44 and provide further design flexibility and functionality. For instance, the support strip 54 may be molded with depressions or recessed areas (not shown) arranged on the side of the strip 54 not facing the tubing 44 and positioned to countersink heads of the fasteners 52. Alternatively, the support strip 54 may be molded to include integral fasteners, such as so-called "pine-tree" or other push-in (or snap-in) clips in which radial projections lock the clip in place after insertion in a corresponding hole in the tubing 44.

The width of the support strip 54 may also accommodate the fasteners 52, which may then extend through the support strip 54 as shown. Alternatively or additionally, the support strip 54 may be shaped such that the fasteners 52 pin the strip 54 against the tubing 44 without actually piercing the strip 54. In these cases, the strip 54 may be narrower (e.g., wire-shaped), and the fasteners 52 may be staples or other fasteners that pierce the tubing 44 on one or both sides of the strip 54.

In any one or more of these cases, the support strip 54 may be sectioned to accommodate, for instance, sharp turns or bends in the contour of the tubing 44.

The tubing 44 may also include a surface shaped to engage the shape of the support strip 54. As best shown in the alternative embodiments of FIGS. 6A-6C, the tubing 44 may have an oval cross-section or other shape in which a flattened surface 56 engages the edge 50 of the soft goods component to facilitate the attachment. Alternatively, the tubing 44 may have a stepped edge or other depression to accept the support strip 54 or some element thereof. Depressions, flattening and other shaping of the tubing 44 may be achieved via stamping and other impact-based techniques, although extrusion-based techniques may be utilized as well.

With reference now to FIGS. 5 and 6A-6C, the edge 50 of the soft goods component includes a loop 58 to further accommodate the attachment in accordance with another aspect of the disclosure. In the exemplary embodiment shown, the loop 58 is formed by wrapping a rim or lip 60 of the edge 50 around the support strip 54. If desired, the support strip 54 may be sewn in the loop 58 via stitching 62 located at a sew-in point (or line), e.g., where the lip 60 overlaps with a fold 64 of the fabric 53 or other soft goods material. Either way, the loop 58 in some cases may extend along the contour of the tubing 44 to form a channel or tunnel through which the support strip 54 runs. However, the loop 58 need not run along the entire edge 50 of the soft goods component. For example, alternative embodiments may include a number of loops formed along the contour of the tubing 44. The loop 58 may also non-uniformly cover the support strip 54 such that, for instance, openings (see, e.g., FIGS. 7B and 7C) are provided for access to the fasteners 52 or fastening mechanism. Moreover, in some cases, the loop 58 may not completely encircle the support strip 54 in which case, for example, the soft goods component may terminate at a point before any overlap occurs.

The loop 58 may be secured in a variety of ways in addition or as an alternative to stitching. For instance, certain soft goods materials (e.g., poly/cotton blends) may be compression-molded or welded to itself. With other soft goods materials, it may be more convenient to utilize staples, tacks or staking at the aforementioned stitching points rather than sewing.

Figure 6A:
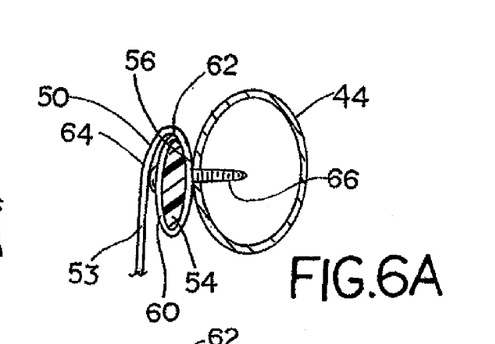
FIGS. 6A-6C are sectional views of the frame section and soft goods attachments taken along lines 6-6 of FIG. 4 in accordance with alternative embodiments; and, FIGS. 7A-7C are sectional views of frame sections and soft goods attachments in accordance with further alternative embodiments.
Figure 6B:
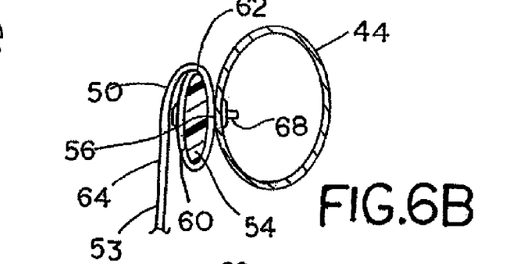
Figure 6C:
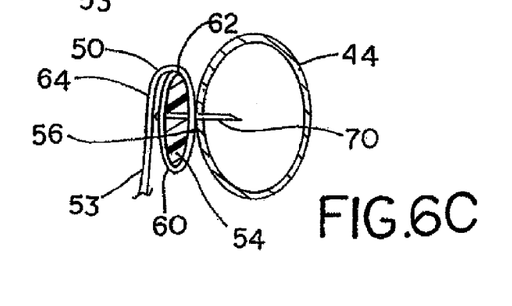

FIGS. 6A-6C depict three alternative fastener types, although additional fastener types are suitable for use with the disclosed designs and techniques. The exemplary embodiment of FIG. 6A has a screw fastener 66 that extends through the loop 58 (and the lip 60) as well as the support strip 54 to attach the soft goods to the tubing 44. The exemplary embodiment of FIG. 6B has a rivet 68, while FIG. 6C depicts a staple or tack 70. Other embodiments may involve pre-formed holes in the tubing 44 and the support strip 54, in which case the push-in (or snap-in) clips described above may be utilized.

In the exemplary cases shown in FIGS. 6A-6C, the lip 60 and the edge 50 are positioned such that the fold 64 covers a head of the fastener. As a result, the attachment configuration, the attachment mechanism, and/or any attachment hardware are hidden from view, and the possibility of user contact with the hardware (e.g., a fastener) during normal use is minimized, if not eliminated. In these cases, the edge 50 includes a plurality of wraps around the support strip 54. The exemplary embodiments of FIGS. 5 and 6A-6C have a first wrap around one end (or side) of the support strip 54 that defines the loop 58, and a second wrap around the other end (or side) of the support strip 54 to cover the attachment configuration. More generally, the attachment configuration may include any number of additional wraps or folds at the edge 50 of the soft goods, as desired.

Figure 7A:
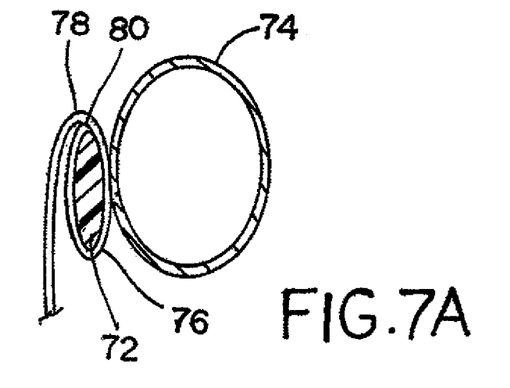
Figure 7B:
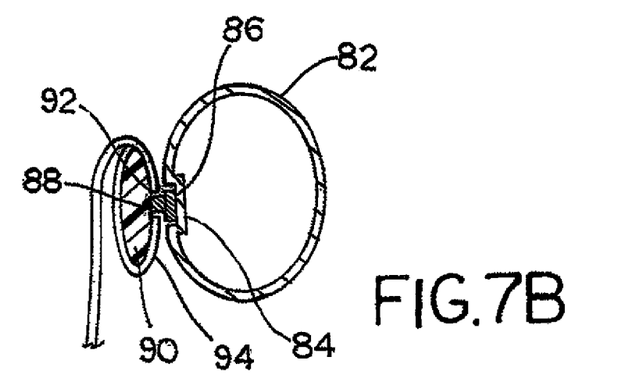
Figure 7C:
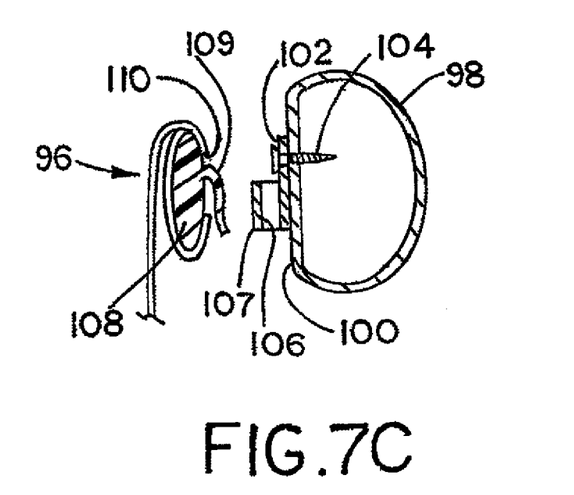

Turning to FIGS. 7A-7C, three attachment configurations are shown in connection with additional alternative attachment configurations and mechanisms. Generally speaking, the transverse fasteners of FIGS. 6A-6C are replaced with in-plane (or planar) attachment configurations. In FIGS. 7A and 7B, attachment is provided without transverse fasteners, while FIG. 7C shows a hook-and-eye configuration that may, but need not, involve fasteners to secure one or more elements to the tubing and support strip elements of the configuration, as described below.

The exemplary embodiment of FIG. 7A establishes a magnetic attachment using a magnetic or magnetized strip 72 and metallic or other tubing 74 suitable for the magnetic attachment. The strip 72 may be similar in size, shape, and other characteristics to the support strip 54 described above. This embodiment may have a similar wrap arrangement including a first wrap 76 around the strip 72 and a second wrap 78 around the strip 72 and a stitching or other connection point 80. Other wrap arrangements are possible, insofar as the wraps need not cover any fasteners.

FIG. 7B depicts a hook-and-loop-based attachment configuration. In this case, tubing 82 may, but need not, have a depression 84 formed to accept a first hook-and-loop fastener 86, which may be shaped as an elongated strip running along the contour of the tubing 82. A corresponding second hook-and-loop fastener 88 may then be disposed on a support strip 90 exposed in a hole 92 in a first soft goods layer 94 wrapping around the strip 90 as shown. Alternatively, the second fastener 88 may be disposed on the soft goods layer 94.

FIG. 7C is an exploded view of yet another in-plane attachment configuration in which a soft goods component indicated generally at 96 is configured for attachment to tubing 98. In this case, the tubing 98 may, but need not, have a flattened surface 100 to which a plate 102 is secured via, for instance, a fastener 104. A groove or slot 106 is formed between the plate 102 and a bracket- or U-shaped projection 107 extending from the plate 102. A support strip 108 includes a clip or hook 109 shaped to engage the slot 106 in a hook-and-eye configuration. To that end, a hole 110 may be formed in the soft goods component 96 in a manner similar to that shown and described in connection with the embodiment of FIG. 7B. Alternatively, the clip 109 may be attached to the soft goods component 96.

In the exemplary case shown in FIG. 7C, the clip 109 is an integral component of the support strip 108. Alternative embodiments may utilize a fastener (not shown) to secure the clip 109 to the strip 108. Access to the fastener may be provided through a hole formed in a portion of the clip 109 adjacent the strip 108.

The disclosed attachment configurations are not limited to support strips of any particular size, shape or material type. For instance, the support strip 54 is described above as a strip to indicate how it runs along the contour of the tubing 44. Thus, the support strip 54 need not be a flat or substantially planar element, and may have or include a varying width. In some cases, the support strip 54 may include a plastically deformable material to enable it to follow a contour of the tubing 44. Alternatively or additionally, the support strip 54 may include a semi-rigid material that has been pre-shaped to follow the contour of the tubing 44. The support strip 54 may accordingly include plastic or metal materials. In still other cases, the support strip 54 may include leather or other welting of a semi-rigid nature.

Another aspect of the disclosure involves a method of assembling a stroller having a soft goods component and a frame, such as the exemplary stroller 10 described above. A support strip is inserted through a channel formed by a loop of the soft goods component disposed at an edge of the soft goods component. The soft goods component is then positioned (if not already) along a contour of the frame such that the support strip extends along the edge of the soft goods component and follows the contour of the frame. The soft goods component is then fastened to the frame with a set of fasteners distributed along the contour of the frame.

To these ends, holes may be pre-formed in one or both of the edge 50 or the support strip 54 to accommodate the fasteners. The loops and channels described above may, but need not, be pre-formed or pre-sewn. In fact, the loops and channels may be formed as the fasteners are installed, insofar as the soft goods attachment involves fasteners that engage the edge 50 as well as the support strip 54.

The support strip may already be shaped to accommodate the contour of the frame. In other cases, the support strip may include a plastically deformable or other flexible material, which is then bent into a shape to accommodate the contour of the frame.

Notwithstanding the foregoing, practice of the disclosed attachment configurations and techniques is not limited to strollers designed to be assembled by an end user. Those elements and aspects of the disclosed strollers related to soft goods attachment may be pre-assembled, or partially assembled to any desired extent. To that end, the foregoing assembly method may be performed at any time, including during manufacturing of the stroller.

Although described in connection with a seating arrangement, the disclosed attachment designs and techniques may be applied to a variety of frame contexts, frame sections, frame types, and other structural elements of the stroller. For instance, stroller canopies, baskets and other soft goods may be attached to structural elements other than the principal frame sections of the stroller. The disclosed techniques and designs are well suited for use in connection with such attachment contexts as well.

The disclosed attachment configurations and assembly methods are not limited to soft goods made of fabric or textile materials. Thus, practice of the disclosed configurations and methods are not limited to any type of soft good, soft good material, or soft good material composition.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

The foregoing description is given for clearness of understanding only, and no unnecessary limitations should be understood therefrom, as modifications within the scope of the invention may be apparent to those having ordinary skill in the art.

What is claimed is:

1. A stroller, comprising:
   a frame having a section;
   a soft goods component with an edge comprising a loop;
   a set of fasteners that attach the soft goods component to the section of the frame at the edge of the soft goods component; and,
   a support strip disposed in the loop and shaped to extend along the edge of the soft goods component and follow the section of the frame to facilitate attachment of the soft goods component to the frame,
   wherein the edge of the soft goods component wraps around the support strip to cover the set of fasteners without the soft goods component wrapping around the section of the frame.

2. The stroller of claim 1, wherein the set of fasteners extend through the support strip to facilitate the attachment of the soft goods component to the frame.

3. The stroller of claim 1, wherein the section of the frame comprises a tubular structure having an oval-shaped cross-section.

4. The stroller of claim 1, wherein the support strip comprises welting.

5. The stroller of claim 1, wherein the support strip comprises a plastically deformable material shaped to follow a contour of the section of the frame.

6. The stroller of claim 1, wherein the support strip comprises a semi-rigid material shaped to follow a contour of the section of the frame.

7. The stroller of claim 1, wherein the support strip comprises a molded component having integral fasteners.

8. The stroller of claim 1, wherein the loop forms a tunnel along the edge of the soft goods component through which the support strip runs.

9. The stroller of claim 2, wherein the edge of the soft goods component further comprises a wrap extending from the loop to cover the set of fasteners.

10. The stroller of claim 2, wherein the support strip comprises a molded component having a plurality of recessed areas to accept the set of fasteners.

11. The stroller of claim 3, wherein the tubular structure comprises a flattened surface to which the edge of the soft goods component is attached.

12. The stroller of claim 11, wherein the support strip is shaped to engage the flattened surface of the tubular structure.

13. A method of assembling a stroller having a soft goods component and a frame, the method comprising the steps of:
- inserting a support strip through a tunnel formed by a loop of the soft goods component disposed at an edge of the soft goods component;
- positioning the soft goods component along a contour of the frame such that the support strip extends along the edge of the soft goods component and follows the contour of the frame; and,
- fastening the soft goods component to the frame with a set of fasteners distributed along the contour of the frame such that the edge of the soft goods component wraps around the support strip to cover the set of fasteners without the soft goods component wrapping around the frame.

14. The method of claim 13, further comprising the step of bending the support strip into a shape to accommodate the contour of the frame.

15. The method of claim 13, wherein the loop is secured in place by stitching.

16. A stroller, comprising:
- a frame having a section;
- a soft goods component with an edge comprising a loop that forms a tunnel running along the edge, the soft goods component being attached to the section of the frame at the edge;
- a support strip inserted in the tunnel and shaped to extend along the edge of the soft goods component and follow the section of the frame to facilitate attachment of the soft goods component to the frame; and
- a set of fasteners that extend through the support strip to secure the soft goods component to the frame,
- wherein the edge of the soft goods component wraps around the support strip to cover the set of fasteners without the soft goods component wrapping around the section of the frame.

17. The stroller of claim 16, wherein the edge of the soft goods component wraps around the support strip to extend from the loop and cover the set of fasteners.

18. The stroller of claim 16, wherein the section of the frame comprises a tubular structure having an oval-shaped cross-section.

19. The stroller of claim 16, wherein the support strip comprises welting.

20. The stroller of claim 16, wherein the support strip comprises a molded component having a plurality of recessed areas to accept the set of fasteners.

21. The stroller of claim 18, wherein the tubular structure comprises a flattened surface to which the edge of the soft goods component is attached.

22. The stroller of claim 21, wherein the support strip is shaped to engage the flattened surface of the tubular structure.

* * * * *

UNITED STATES PATENT AND TRADEMARK OFFICE
CERTIFICATE OF CORRECTION

| | | |
|---|---|---|
| PATENT NO. | : 7,938,433 B2 | Page 1 of 1 |
| APPLICATION NO. | : 11/688825 | |
| DATED | : May 10, 2011 | |
| INVENTOR(S) | : Robert T. Pike et al. | |

It is certified that error appears in the above-identified patent and that said Letters Patent is hereby corrected as shown below:

On the title page, item [56]

In References Cited:

U.S. Patent Document 184,867 should be dated 11/1876.

Signed and Sealed this

Thirteenth Day of September, 2011

David J. Kappos
*Director of the United States Patent and Trademark Office*